Patented Dec. 21, 1943

2,337,027

UNITED STATES PATENT OFFICE 2,337,027

MANUFACTURE OF FURAN

Oliver W. Cass, Niagara Falls, N. Y., and Lawrence G. Cliver, Baton Rouge, La., assignors to E. I. du Pont de Nemours & Company, Wilmington, Del., a corporation of Delaware No Drawing. Application March 4, 1940, Serial No. 322,172

9 Claims. (Cl. 260—345)

This invention relates to the preparation of furan and more particularly to the manufacture of furan from furfuraldehyde.

The prior art discloses methods for the preparation of furan, but none of the disclosed methods is suitable for the manufacture of furan on a large scale since all of the prior art disclosures describe methods which are either extremely inefficient or expensive. One method, which is illustrative of the state of the art, consists in dropping furfuraldehyde into a fused potassium hydroxide-sodium hydroxide mixture and recovering furan from the gaseous reaction products. This method which is disclosed in the Journal of the American Chemical Society, vol. 54, page 2532 (1932) is expensive and difficult to control. The formation of solid alkali metal carbonates in the fused caustic mixture produces a viscous, immobile mass which is impractical to agitate and which prevents effective contact between the furfuraldehyde and caustic. This condition results in an incomplete reaction and considerable decomposition of the furfuraldehyde as well as inefficient utilization of the potassium and sodium hydroxides. Some additional methods for the preparation of furan are known, but all previously known methods either result in low yields or require expensive starting materials.

It is one of the objects of the present invention to provide a new and improved method for the production of furan from furfuraldehyde. Another object is to provide a method for the preparation of furan which utilizes readily available and inexpensive raw materials. A further object of this invention is to provide a method for the preparation of furan from furfuraldehyde whereby good yields of furan are obtained. In short, it is one of the principal objects of the present invention to provide a practical method for the production of furan. These and further objects will be apparent from the following description of our invention.

The above objects are attained in accordance with our invention by passing the vapors of furfuraldehyde in contact with lime at elevated temperatures.

We have discovered that when furfuraldehyde is vaporized and the vapors are passed in contact with lime at elevated temperatures, e. g. at 350 to 550° C., furan is formed in good yield.

We have further discovered that although the reaction illustrated above may be utilized directly to produce furan, greatly improved results are obtained when the vapors of furfuraldehyde are mixed with steam before contacting the vapors with lime. We have found that the presence of steam promotes the reaction so that substantially increased yields of furan are obtained.

The furan may be recovered from the off-gases, for instance, by first fractionally condensing the products to remove a substantial portion of water and unreacted furfuraldehyde. The remaining gaseous mixture may then be compressed, passed to a second condenser, where the furan is condensed and the by-product hydrogen vented at this point. The furan and small amount of water in the condensate separate into layers and the upper furan layer may then be removed, dried by refrigeration, and fractionally distilled to obtain furan in purified form.

The following description illustrates a preferred embodiment of our invention, in which steam is utilized as a diluent in the reaction of the furfuraldehyde vapors with lime. Finely divided lime is heated to a temperature of 350 to 550° C. in a cylindrical iron reactor equipped with a suitable stirring device for agitation of the lime. The lime which may be used in practicing our invention may be either the hydrated variety known as slaked lime or calcium hydroxide, or we may utilize lime in the form of quicklime or calcium oxide. In the case of the former material we have found that small amounts of moisture are not detrimental to the operation of our novel process, and we have obtained excellent results using lime containing as much as 3% excess water. Furthermore, it is possible to use lime in flake or granular form or as a finely divided material. The reactor is arranged in a horizontal position and an ordinary paddle type agitator may be used. A suitable means of heating is provided, such as gas burners or electric heating coils. In carrying out the process on a small scale a molten lead bath provided with an electric heater may be utilized for heating the reactor, whereas for large scale operation gas or oil heating methods are desirable, although this feature will be determined to a great extent by economics in any given case. Since the reaction of furfuraldehyde with lime is exothermic, it is probable that in very large scale operations the ratio of reaction heat to thermal loss by radiation will diminish to the point where little or no heating of the reactor would be required except to initiate the reaction. We prefer to maintain a temperature of 470 to 490° C. within the reactor, since it has been found that within this range of temperature the process is most efficient. However, any temperature within the range of 350 to 550° C. may be utilized without departing from the scope of our invention, since good yields of furan may be obtained when the process is carried out within this temperature range. An excess of lime is fed into one end of the reactor from a suitable storage vessel. Since lime is a comparatively inexpensive material, we have found it desirable to supply a substantial excess of this reactant to the reactor to insure as complete reaction as possible. An excess of 100–200% over the amount of lime theoretically required has proven beneficial, although not essential. In calculating the excess it is assumed that complete reaction theoretically requires equimolecular proportions of the reactants although such an assumption is made only for convenience in defining the desired excess. We have found it desirable to admit the lime into the reactor intermittently, when utilizing a continuous method, to avoid plugging of the lime inlet due to absorption of steam and furfuraldehyde vapors by the lime. However, this is not essential and depends primarily upon the particular apparatus used. Measured amounts of steam and furfuraldehyde are passed through a preheater and thence into the reactor co-currently with the lime. Agitation of the lime sufficient to provide good contact between the vapor and solid is maintained and the rate of flow of the vapor mixture through the reactor is so adjusted that the time of contact of vapor with lime is preferably within the range of 15 to 30 seconds, although this feature may be varied considerably without departing from the scope of our invention. The period of contact of vapors with lime may be varied from 1 to 50 seconds, although we have found that prolonged exposure of the furfuraldehyde vapors in contact with lime causes a decrease in the yield of furan probably due to carbonization of the product. The molar ratio of steam to furfuraldehyde vapor is preferably maintained within the range 3 to 1 to 5 to 1. However, the steam-to-furfuraldehyde vapor ratio may be varied over a wide range, with satisfactory results. Fair yields of furan are obtained with only a trace of water vapor present, while a mixture of 40 moles of steam to one mole of furfuraldehyde vapor may be employed if desired. It is not essential that the ratio of steam to furfural be restricted to any particular value for the successful operation of our invention.

Furan is recovered from the off-gases by any suitable means which will be apparent to those skilled in the art. The following description illustrates a procedure which we have found to be satisfactory. The hot gaseous mixture from the reactor may be passed through a dust collector to remove spent and unreacted lime and then into a condenser capable of cooling the gases to about 30° C. In this condenser a large portion of the water and unreacted furfuraldehyde condenses and is removed. The off-gases from the first condenser are compressed and passed into a second condenser where the furan is liquefied, and at this point the hydrogen and other non-condensable gases are vented. The condensate separates into a water and a furan layer. The furan layer is removed, dried by refrigeration and fractionated to obtain purified furan.

We may also carry out the process of our invention without the use of steam or diluent gas. In practicing our invention in this manner, furfuraldehyde is vaporized and passed in contact with lime at elevated temperatures according to the procedure previously described for reacting furfuraldehyde vapors with lime in the presence of steam.

From the foregoing description it will be apparent that our invention consists of a novel process for the manufacture of furan which comprises reacting furfuraldehyde vapors with lime at elevated temperatures, while in the preferred embodiment of our invention, we may react furfuraldehyde vapors with lime in the presence of steam by passing a mixture of furfuraldehyde vapors and steam in contact with lime at elevated temperatures.

The following examples are illustrative of our invention:

*Example I*

2 moles of furfuraldehyde and 7 moles of water were fed through a preheater in which the mixture was heated to a temperature approaching 300° C., at rates of 3.9 cc. per minute and 2.8 cc. per minute respectively. The vapor mixture from the preheater was then passed through a cylindrical iron reactor containing 1300 cc. of finely divided hydrated lime and a free space of 1500 cc. The lime was agitated and the temperature maintained at 350 to 450° C. during the reaction period. The contact time between the vapor and lime was 8.3 seconds. The off-gases were collected and condensable material separated. 0.1 mole of unreacted furfuraldehyde was recovered. The yield of furan was 62% based on the furfuraldehyde input.

*Example II*

3.47 moles of furfuraldehyde were fed through a preheater, in which the material was heated to a temperature approaching 300° C., at the rate of 3.3 cc. per minute. From the preheater the furfuraldehyde vapor was passed through a cylindrical iron reactor containing 1250 cc. of finely divided hydrated lime and a free space of 1550 cc. The lime was agitated and the temperature maintained at 350 to 450° C. during the reaction period. The contact time between lime and vapor was 51 seconds. The off-gases were collected and the condensable material separated. The yield of furan was 38.3% based on the furfuraldehyde input.

Various modifications of our invention may be made without departing from the scope and spirit thereof. For instance, instead of the steam and furfuraldehyde mixture, part or all of the steam may be replaced by an inert gas such as nitrogen. However, in most cases it will be more convenient and economical to utilize steam only as the diluent. Our process may be carried out in a continuous manner or a batch process may be used. Furthermore, the unreacted furfuraldehyde recovered may be revaporized and recirculated through the system. It is also possible to utilize a rotary reactor in place of a stationary reactor with a stirrer. Another possible modification consists in passing the vapor mixture countercurrent to instead of co-current with the lime feed. These and other modifications and equivalents of our invention will be apparent to those skilled in chemical manufacture.

It is understood that our invention is not limited by the examples and modifications described above, but it is to be construed in accordance with the scope of the following claims.

We claim:

1. A process for preparing furan which comprises passing the vapors of furfuraldehyde in contact with a reagent consisting essentially of a calcium compound selected from the group consisting of calcium oxide and calcium hydroxide at 350 to 550 C.

2. A process for preparing furan which comprises passing a mixture of furfuraldehyde vapors and steam in contact with a reagent consisting essentially of a calcium compound selected from the group consisting of calcium oxide and calcium hydroxide at 350 to 550° C.

3. A process for preparing furan which comprises passing the vapors of furfuraldehyde in contact with a reagent consisting essentially of a calcium compound selected from the group consisting of calcium oxide and calcium hydroxide at 350 to 550° C. and maintaining the period of contact of said vapors with lime within the range of 1 to 50 seconds.

4. A process for preparing furan which comprises passing a mixture of furfuraldehyde vapors and steam in contact with a reagent consisting essentially of a calcium compound selected from the group consisting of calcium oxide and calcium hydroxide at 350 to 550° C. and maintaining the period of contact of said vapor with lime within the range 1 to 50 seconds.

5. A process for preparing furan which comprises passing a mixture of furfuraldehyde vapors and steam in contact with a reagent consisting essentially of a calcium compound selected from the group consisting of calcium oxide and calcium hydroxide at 350 to 550° C. and maintaining the molar ratio of steam to furfuraldehyde in said mixture within the range of 0.1 to 1 to 40 to 1.

6. A process for preparing furan which comprises passing a mixture of furfuraldehyde vapors and steam in contact with a reagent consisting essentially of a calcium compound selected from the group consisting of calcium oxide and calcium hydroxide at 350 to 550° C., maintaining the molar ratio of steam to furfuraldehyde vapors in said mixture within the range of 0.1 to 1 to 40 to 1, and maintaining the period of contact of said vapors with lime within the range of 1 to 50 seconds.

7. A process for preparing furan which comprises passing a mixture of furfuraldehyde vapors and steam in contact with a reagent consisting essentially of a calcium compound selected from the group consisting of calcium oxide and calcium hydroxide at 350 to 550° C., maintaining the molar ratio of steam to furfuraldehyde vapors in said mixture within the range of 3 to 1 to 5 to 1, and maintaining the period of contact of said vapors within the range of 15 to 30 seconds.

8. A process for preparing furan which comprises passing furfuraldehyde vapors in contact with a reagent consisting essentially of a calcium compound selected from the group consisting of calcium oxide and calcium hydroxide at 470 to 490° C. and maintaining the period of contact of said vapors with lime substantially within the range of 15 to 30 seconds.

9. A process for preparing furan which comprises passing a mixture of furfuraldehyde vapors and steam in contact with a reagent consisting essentially of a calcium compound selected from the group consisting of calcium oxide and calcium hydroxide at 470 to 490° C., maintaining the molar ratio of steam to furfuraldehyde vapors in said mixture within the range 3 to 1 to 5 to 1, and maintaining the period of contact of said vapors with lime substantially within the range of 15 to 30 seconds.

OLIVER W. CASS.
LAWRENCE G. CLIVER.